US012264487B2

(12) United States Patent
Prothero

(10) Patent No.: US 12,264,487 B2
(45) Date of Patent: Apr. 1, 2025

(54) MODULAR STRUCTURE FOR PROVIDING ON-SITE PROTECTION

(71) Applicant: BAM NUTTALL LIMITED, Camberley (GB)

(72) Inventor: John Prothero, Camberley (GB)

(73) Assignee: BAM NUTTALL LIMITED, Camberley (GB)

( * ) Notice: Subject to any disclaimer, the term of this patent is extended or adjusted under 35 U.S.C. 154(b) by 36 days.

(21) Appl. No.: 17/760,043

(22) PCT Filed: Feb. 5, 2021

(86) PCT No.: PCT/GB2021/050256
§ 371 (c)(1),
(2) Date: Aug. 3, 2022

(87) PCT Pub. No.: WO2021/156625
PCT Pub. Date: Aug. 12, 2021

(65) Prior Publication Data

US 2023/0065334 A1 Mar. 2, 2023

(30) Foreign Application Priority Data

Feb. 6, 2020 (GB) ..................................... 2001631

(51) Int. Cl.
*E04G 21/24* (2006.01)
*E04B 1/19* (2006.01)
(Continued)

(52) U.S. Cl.
CPC .............. *E04G 21/242* (2013.01); *E04B 1/19* (2013.01); *E04B 1/342* (2013.01);
(Continued)

(58) Field of Classification Search
CPC ........ E04B 1/19; E04B 1/342; E04B 1/34336; E04B 1/34384; E04B 1/3527; E04G 21/242; E04G 21/28
(Continued)

(56) References Cited

U.S. PATENT DOCUMENTS 3,534,511 A * 10/1970 Cappella ................... E04H 4/10 135/912
4,426,744 A * 1/1984 Love ..................... E04B 1/3455 4/488
(Continued)

FOREIGN PATENT DOCUMENTS

AU 2015295620 B2 3/2018
CN 110259162 9/2019
(Continued)

OTHER PUBLICATIONS

PCT Search Report and Written Opinion prepared for PCT Application No. PCT/GB2021/050256, completed Apr. 26, 2021.
(Continued)

*Primary Examiner* — James J Buckle, Jr.
(74) *Attorney, Agent, or Firm* — Barnes & Thornburg LLP

(57) ABSTRACT

The present invention relates to a modular assembly, a site factory, for at least partially enclosing a site during construction of a structure. The modular assembly comprising: a plurality of portal frames, each portal frame comprising two columns and a roof beam, each column and roof beam comprising a plurality of pre-assembled units; a jack-up frame for each column; at least two first rails, each of the first rails being mounted to at least one of the roof beams; at least one second rail slidably mounted to the at least two first rails; and a plurality of panels of a flexible material configured to provide a full enclosure of the site and mounted above the roof beam. The or each second rail is configured
(Continued)

to slidably receive at least one lifting device. The pre-assembled units are configured to be connected on site, and lifted using said jack-up frames, to form the portal frames, and wherein each first rail, and the or each second rail are configured to be mounted on the portal frames on site.

18 Claims, 12 Drawing Sheets

(51) Int. Cl.

| | |
|---|---|
| ***E04B 1/342*** | (2006.01) |
| ***E04B 1/343*** | (2006.01) |
| ***E04B 1/35*** | (2006.01) |
| ***E04G 21/28*** | (2006.01) |
| *B66C 17/00* | (2006.01) |

(52) U.S. Cl.

CPC ...... *E04B 1/34336* (2013.01); *E04B 1/34384* (2013.01); *E04B 1/3527* (2013.01); *E04G 21/28* (2013.01); *B66C 17/00* (2013.01)

(58) Field of Classification Search

USPC ........................................................... 52/63

See application file for complete search history.

(56) References Cited

U.S. PATENT DOCUMENTS 4,926,591 A * 5/1990 Buijs .................... E04B 1/3447 52/63
5,201,152 A * 4/1993 Heffner .................. E04G 21/24 52/64
5,327,691 A * 7/1994 Eryou .................. E04B 1/3455 52/64
6,637,160 B2 * 10/2003 Brooks .................. E04H 3/165 296/105
6,952,900 B2 * 10/2005 Leurent .................. E04H 3/165 52/80.1
11,193,287 B2 * 12/2021 Tan ....................... E04G 21/142
11,339,564 B1 * 5/2022 Hedgepeth ............ E04B 1/2403
11,767,680 B2 * 9/2023 van Kleef ............... B66C 17/20 52/63
2012/0000141 A1 * 1/2012 Forsland ............ E04B 1/34305 52/66

FOREIGN PATENT DOCUMENTS

| | | | |
|---|---|---|---|
| FR | 2538428 | | 8/1985 |
| JP | H05-171817 | | 7/1993 |
| JP | H06-146609 | | 5/1994 |
| JP | H07207928 | | 8/1995 |
| JP | H07279436 | A | 10/1995 |
| JP | H10131508 | A | 5/1998 |
| JP | H1130038 | | 2/1999 |
| JP | 2014227651 | | 12/2014 |
| KR | 100632962 | | 10/2006 |
| KR | 1020090084190 | A | 8/2009 |
| WO | 2016016047 | A1 | 2/2016 |

OTHER PUBLICATIONS

Notice to Submit Response issued by the Korean Intellectual Property Office on May 8, 2024, for Korean Patent Application No. 10-2022-7030636, and its English translation (15 pages).

Communication pursuant to Article 94(3) EPC issued by the European Patent Office in European Patent Application No. 21705251.3; dated Nov. 23, 2023; 46 pages.

Notice of reasons for refusal issued by the Japan Patent Office in Japanese Patent Application No. 2022-548203; dated Mar. 5, 2024; 2 pages (original) and 2 pages (translation).

* cited by examiner

MODULAR STRUCTURE FOR PROVIDING ON-SITE PROTECTION

CROSS-REFERENCE TO RELATED APPLICATIONS

This application is the U.S. national phase of PCT/GB2021/050256, filed on Feb. 5, 2021, which claims the benefit of United Kingdom Patent Application Number 2001631.7, filed on Feb. 6, 2020, the entire disclosures of both of which are hereby incorporated by reference herein.

The present invention relates to the field of providing protection from environmental elements for a construction site and to protecting the existing surrounding environment from the construction.

Whenever a structure is to be built it is necessary to consider protection of the construction from the environment. External factors, such as rain, wind, temperature and light levels can all reduce the productivity of the works. These factors can significantly affect major works and construction projects. It is also necessary to investigate the impact the construction will have on the surrounding area. This is particularly the case when the construction is a building such as a nuclear power plant, where precision, consistency, and accountability are critical. In order to mitigate the impact of construction works on the surrounding area, conventional construction must necessarily be carried out in an inefficient manner. Daylight, weather, and noise pollution will all limit the average number of hours that construction can be carried out each day. This will particularly be the case where the construction site is located in an area designated as a dark sky reserve, where light pollution is a particular issue.

Even before construction begins, significant time and cost must be spent on obtaining permission, in the form of a development consent order (DCO), to begin construction. Depending on the location of the construction site, as well as the type of building being constructed, the cost of obtaining the DCO may be a significant proportion of the total budget. One of the biggest problems when applying for a DCO is to demonstrate the impact of the construction on a potential site. Detailed studies on the sensitivity that the existing environment may have to the construction works need to be carried out. This leads to high costs to ensure that the impact is fully understood.

It would be advantageous to find a way of reducing this cost. It would also be advantageous to provide a way of reducing or eliminating external factors which reduce the productivity of the construction.

The present invention provides a modular assembly which can seal the site from the surrounding environment. The modular assembly is manufactured from a plurality of components that contain all the elements needed to construct the structure in a closed and sealed environment.

According to a first aspect of the present invention there is provided a modular assembly for at least partially enclosing a site during construction of a structure, the modular assembly comprising: a plurality of portal frames, each portal frame comprising two columns and a roof beam, each column and roof beam comprising a plurality of pre-assembled units; a jack-up frame for each column; at least two first rails, each of the first rails being mounted to at least one of the roof beams; at least one second rail slidably mounted to the at least two first rails; and a plurality of panels of a flexible material configured to provide a full enclosure of the site and mounted above the roof beam. The or each second rail is configured to slidably receive at least one lifting device. The pre-assembled units are configured to be connected on site, and lifted using said jack-up frames, to form the portal frames, and wherein each first rail, and the or each second rail are configured to be mounted on the portal frames on site.

The modular assembly preferably further comprises at least one lifting device slidably mounted to the at least one second rail, wherein the or each lifting device is configured to be mounted on the portal frames on site.

By providing a modular assembly for enclosing a site during construction of a structure the site may reduce its impact on the surrounding area. It can reduce or eliminate noise, light, dust, vibration, and over-air pressure leaving the site. It may provide a humidity and/or temperature controlled environment. The invention allows the construction to be delivered with no impact from external conditions. Due to the enclosure the construction of the structure is not impacted by the weather. Work is therefore not interrupted due to adverse weather conditions. The construction can take place in perfect conditions twenty four hours of the day without interruption or downtime. Certainty and productivity may therefore be improved. The quality of the works can be improved due to the ability to control the environment. The invention allows weather sensitive equipment to be delivered without interruption.

An advantage of the modular assembly is that construction of the structure can take place continuously. No time is lost due to adverse weather conditions. As the modular assembly prevents light pollution leaving the site the construction can also take place at night. It is important that light does not escape during construction as some sites may be in areas designated as a dark sky reserve status.

The modular assembly of the invention provides two way protection for the construction site and the environment.

The distance between portal centres may be between about 5 m and about 30 m, preferably between about 10 m and about 25 m, more preferably between about 15 m and about 20 m. The modular assembly preferably comprises a plurality of members configured to be connected between adjacent portals. The members are configured to maintain the separation between the portals.

As will be appreciated, the term "centres" is a well-known term of art which refers to the distance between the centre line of a first beam, truss, or elongate component, and a second such beam, truss, or elongate component.

The modular assembly is sized according to the requirements of the construction site. The assembly may be sized such that the minimum horizontal distance from the assembly to the structure to be constructed is between about 3 m and about 15 m, preferably between about 4 m and about 10 m. The modular assembly may be sized such that the minimum vertical distance from the assembly to the structure to be constructed is between about 3 m and about 10 m, preferably between about 4 m and about 6 m.

The modular assembly may be sized, and positioned, such that the minimum distance from the assembly to the structure to be constructed on a first side of the structure to be constructed is at least 8 m, preferably at least 10 m. In this way an access route may be provided for the provision of materials into the assembly.

Each pre-assembled unit for forming said roof beams may have a length between about 5 m and about 20 m, preferably between about 12 m and about 18 m. In a particularly preferred embodiment, each pre-assembled unit for forming said roof beams has a length of about 16 m or less. Providing the pre-assembled units with a length of 16 m or less may ensure that they can be easily delivered by conventional lorry.

Each pre-assembled unit for forming said roof beams may have a cross-sectional width of between about 1 m and about 10 m, preferably between about 2 m and about 5 m. In a preferred embodiment, the cross-sectional width of each pre-assembled unit for forming a roof beam is about 2 m. Each pre-assembled unit for forming said roof beams may have a cross-sectional height of between about 1 m and about 10 m, preferably between about 2 m and about 5 m. In a preferred embodiment, the cross-sectional width of each pre-assembled unit for forming a roof beam is about 2 m. In a preferred embodiment, the cross-sectional height of each pre-assembled unit for forming a roof beam is about 4 m. The cross-sectional shape of each said pre-assembled unit for forming said roof beams may be square, trapezoidal, triangular or any other suitable shape. In a preferred embodiment, the cross-sectional shape of each said pre-assembled unit for forming said roof beams is triangular.

Each pre-assembled unit for forming said columns may have a length between about 5 m and about 20 m, preferably between about 12 m and about 18 m. In a particularly preferred embodiment, each pre-assembled unit for forming said columns has a length of about 16 m or less. Providing the pre-assembled units with a length of 16 m or less may ensure that they can be delivered by conventional lorry.

Each pre-assembled unit for forming said columns may have a cross-sectional width of between about 1 m and about 10 m, preferably between about 2 m and about 5 m. The cross-sectional shape of each said pre-assembled unit for forming said columns may be square, trapezoidal, triangular or any other suitable shape. In a preferred embodiment, the cross-sectional shape of each said pre-assembled unit for forming said roof beams is triangular.

However, as will be appreciated, the roof beams and columns may be sized in accordance with the required overall dimensions of the modular assembly, and in accordance with the required total lifting capability to be provided within the modular assembly.

Preferably, the modular assembly comprises pre-assembled units for forming the connection between the roof beam and the column.

In a preferred embodiment, each said first rail is mounted to a plurality of roof beams. Preferably, each said first rail is mounted substantially perpendicularly to the longitudinal axis of said roof beams. The at least two first rails may be mounted such that the distance between the respective centres of said first rails is between about 10 m and about 20 m. Preferably, the distance between centres is between about 12 m and about 18 m, more preferably between about 14 m and about 16 m.

In a preferred embodiment, the modular assembly comprises at least one set of second rails, each set comprising a pair of second rails slidably mounted to the at least two first rails. Each pair of second rails are spaced apart by a plurality of separation members and configured to receive at least one lifting device configured for use on a double rail system. The pair of second rails in each set may be spaced apart by between about 1 m and about 5 m, preferably between about 2 m and about 4 m. Where a plurality of sets of second rails are provided, differently sized sets, that is the distance between the second rails, may be provided, or each set may have the same size, or a combination of same sized sets and differently sized sets.

The or each second rail is preferably slidably mounted perpendicularly to said first rails.

The modular assembly may include means for determining the relative position of the or each lifting device as compared to the modular assembly. Advantageously, providing such determining means enables increased accuracy, and efficiency, of the construction of the structure by ensuring that the components are positioned accurately and more quickly than by using conventional means. Alternatively, the means for determining the relative position of the or each lifting device is as compared to a datum point on, or near, the structure being constructed. Preferably, the means for determining the relative position of the or each lifting device comprises a plurality of sensors configured to respectively determine the position of the or each second rail supporting the lifting device relative to the first rails supporting the or each second rail, and configured to determine the position of the or each lifting device relative to the or each second rail supporting the or each lifting device. The means for determining the relative position of the or each lifting device, may further comprise means for determining the relative position of the lifting hook of the lifting device relative to the lifting device. In this way, the position of the lifting hook relative to either the modular assembly, or the structure being constructed, can be determined in three dimensions.

Alternatively, the means for determining the relative position of the lifting hooks may comprise a wireless transceiver mounted to each lifting hook, and a plurality of transmitters disposed in known locations throughout the modular assembly, each transmitter configured to transmit a signal with a unique ID. In a similar manner to the Global Positioning System (GPS), the time of arrival of each unique signal at a particular hook transceiver can be used to determine the position. Any other suitable indoor positioning system (IPS) may be used. Such a system may also be used to precisely locate, and position, components in the structure being built, by attaching one or more such wireless transceivers to the component to be located and positioned.

The assembly may also further comprise foundation rails which are configured to allow movement of the assembly. A bogie may be configured to slidably mount on the foundation rail to carry a portal frame. Each bogie preferably comprises means for locking the position of the bogie relative to the rail. The means for locking the position may comprise a brake, locking pins, or the like. The assembly may comprise a first set of foundation rails disposed along a first edge of the assembly, and a second set of foundation rails disposed along a second, opposed, edge of the assembly. Each set of foundation rails preferably comprises two foundation rails. As will be appreciated, the size and number of foundation rails are determined according to the size and weight of the modular assembly.

Alternatively to foundation rails, the assembly may comprise elongate channels, preferably of steel, for receiving the bogies of the portals.

If the modular assembly has been constructed with foundation rails configured to allow movement this has the advantage that the assembly may be moved once assembled. This allows large equipment to be entered if necessary after construction has begun, or for the assembly to be moved away from the completed structure for dis-assembly.

The assembly may comprise two parts, each part comprising a plurality of portals, each part being slidable independently on said foundation rails such that the parts can be divided once assembled.

If the modular assembly having two parts has been constructed with foundation rails configured to allow movement this has the advantage that the assembly may be parted to divide the assembly once assembled. This allows large equipment to be entered if necessary after construction has begun.

The first rails may have a length which is substantially equal to the length of the modular assembly. The first rails may have a length between about 50% and about 100% of the length of the modular assembly.

Where the modular assembly is provided in two parts, the first rails may have a length which is substantially equal to the length of one part of the modular assembly. In addition, the modular assembly may comprise two sets of first rails, and corresponding second rails, a first set provided in the first part of the modular assembly, and a second set provided in the second part of the modular assembly. The first set and the second set may be of different sizes depending on requirements. The first set of first rails may be alignable with the second set of first rails, such that the second rails are transferable from the first set of first rails to the second set of first rails, and vice versa.

The modular assembly may further comprise at least one edge rail system mounted adjacent an edge of the assembly, the or each edge rail system comprising: at least two third rails each of the third rails being mounted to at least one of the roof beams; at least one fourth rail slidably mounted to the at least two third rails to form an edge rail system and configured to slidably receive at least one lifting device, wherein said at least one fourth rail is configured to be alignable with said at least one second rail to enable transfer of a lifting device between the at least one second rail and the at least one fourth rail.

The at least two third rails may be mounted such that the distance between the respective centres of said third rails is between about 3 m and about 15 m. Preferably, the distance between centres is between about 5 m and about 10 m, more preferably between about 6 m and about 8 m.

Each edge rail system may comprise at least one set of fourth rails, each set comprising a pair of fourth rails slidably mounted to the at least two third rails. Each pair of fourth rails being spaced apart by a plurality of separation members and configured to receive at least one lifting device configured for use on a double rail system.

Preferably, the or each fourth rail is slidably mounted perpendicularly to said third rails. In a preferred embodiment, each edge rail system comprises two third rails.

The modular assembly may comprise at least two such edge rail systems, each edge rail system disposed adjacent a respective edge of the assembly.

Advantageously, providing at least one edge rail system enables materials to be more easily and efficiently transferred from delivery lorries, and the like, to the required location within the modular assembly.

The first rails, second rails, third rails, and fourth rails, are preferably I-beams, and are preferably formed of steel.

The at least one second rail, and/or the at least one fourth rail, of the modular assembly may carry a plurality of lifting devices. The lifting devices may be cranes.

The pre-assembled units of the portal frames may be formed from truss structures.

The modular assembly may also include a plurality of end trusses, to form end walls, and close the ends thereof. Each end truss may be formed of a plurality of pre-assembled end truss units. The plurality of end trusses are preferably arranged substantially vertically, and are connected to the roof beams of the end portals. The assembly may further comprise a plurality of members configured to connect adjacent end trusses. The end trusses are preferably configured to provide an entrance for building materials, and the like. The entrance may comprise a door formed of the fabric panels. Alternatively the entrance may be formed by a door formed of any suitable solid material. The solid doors may be formed from elements assembled on site.

The pre-assembled units which make up the modular assembly may be transported to the construction site by lorry.

It is not essential that the modular assembly is the same height throughout. Portal frames of differing heights may be used.

The panels of fabric may be formed from a thermal fabric. Noise reducing material may also be used instead of, or as well as, the thermal fabric.

The fabric may be formed of at least two layers, the layers being spaced apart. An insulation layer may be provided between the layers of thermal fabric. The layers of thermal fabric and the insulation layer may be quilted to form a continuous sandwiched material.

The fabric of the noise reducing panels may be formed of a double skin with a suitable filler in-between.

Advantageously, providing panels of thermal fabric to form an enclosure enables the environment within the assembly to be controlled. In particular, the use of thermal fabric with low air permeability may increase the proportion of the year that concrete may be poured, assuming a minimum temperature for pouring concrete of 2 degrees C. and rising, may be increased by at least 5%, more preferably by at least 10%. This increase does not require direct heating of the assembly, merely people, lighting and equipment provide sufficient indirect heating to enable the increase.

The outer surface of the panels may be painted. Advantageously, painting the panels may enable the assembly to help blend in with the environment.

According to a second aspect of the present invention, there is provided a method of assembling the modular assembly as described herein, the method comprising the steps of: positioning a plurality of jack up frames; providing a plurality of pre-assembled units and using said jack up frames to synchronously build-up a plurality of portal frames from the pre-assembled units, each portal frame comprising two columns and a roof beam; mounting at least two first rails to at least one roof beam; slidably mounting at least one second rail to the at least two first rails; slidably mounting at least one lifting device to at least one second rail; and mounting a plurality of panels of a flexible material on top of the portal frame. The mounting steps take place after the roof beams are connected to the respective columns, and before the columns are built-up to the required height.

Preferably, the step of synchronously building-up the plurality of portal frames comprises; positioning a first pre-assembled column unit within said jack-up frame; connecting a plurality of pre-assembled roof beam units to form a plurality of roof beams; connecting each formed roof beam to a respective pair of the positioned pre-assembled column units; and, after the mounting steps, synchronously jacking-up each pre-assembled column unit and positioning and connecting further pre-assembled column units within said jack-up frame. As will be appreciated, the step of synchronously jacking-up each pre-assembled column unit and positioning and connecting further pre-assembled column units within said jack-up frame is repeated until the portal frames are at the desired height. Alternatively, two or more pre-assembled column units may be positioned, and jacked-up, before the roof beam is connected.

Advantageously, mounting roof level components, such as the first rails, second rails, lifting devices, and pre-furled panels, reduces the requirement of works to be carried out at height. This increases the safety and efficiency of assembling the modular assembly.

Preferably, the method comprises providing foundation rails configured to allow movement of the assembly wherein the modular assembly is assembled adjacent the construction site and then slid along the rails to the site, wherein the step of positioning the plurality of jack-up frames comprises rolling said jack-up frames along said foundation rails.

According to a third aspect of the present invention, there is provided a kit of parts for a modular assembly for at least partially enclosing a site during construction of a structure, the kit comprising: a plurality of pre-assembled units for forming a plurality of portal frames, each portal frame comprising two columns and a roof beam; a pair of jack up frames for each portal frame; a plurality of first rails; at least one second rail; and a plurality of pre-furled panels of a flexible material.

According to a fourth aspect of the present invention, there is provided use of a modular assembly as described herein, the modular assembly providing a site factory for the construction of a structure.

Once all equipment is installed inside the modular assembly it can be sealed against the weather and construction of the structure can begin with minimum or no contact with the exterior. Due to the sealing of the site much less impact assessment on the surrounding environment need be done which leads to large cost savings.

As used herein, the term longitudinal refers to the direction along the greater dimension of a component or feature. Similarly, the term transverse refers to the direction, perpendicular to the longitudinal direction, along the lesser dimension of a component or feature.

The roof beams, as described herein, are preferably arranged in the transverse direction of the modular assembly. The first rails, and where provided the third rails, as described herein, are preferably arranged along the longitudinal direction of the modular assembly. The second rails, and where provided the fourth rails, as described herein, are preferably arranged along the transverse direction of the modular assembly. However, as will be appreciated, the first rails, and where provided the third rails, may be arranged along the transverse direction of the modular assembly. In this embodiment, the second rails, and where provided the fourth rails, are arranged along the longitudinal direction of the modular assembly.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

The invention will be further described, by way of example only, with reference to the accompanying drawings in which.

Figure 1:
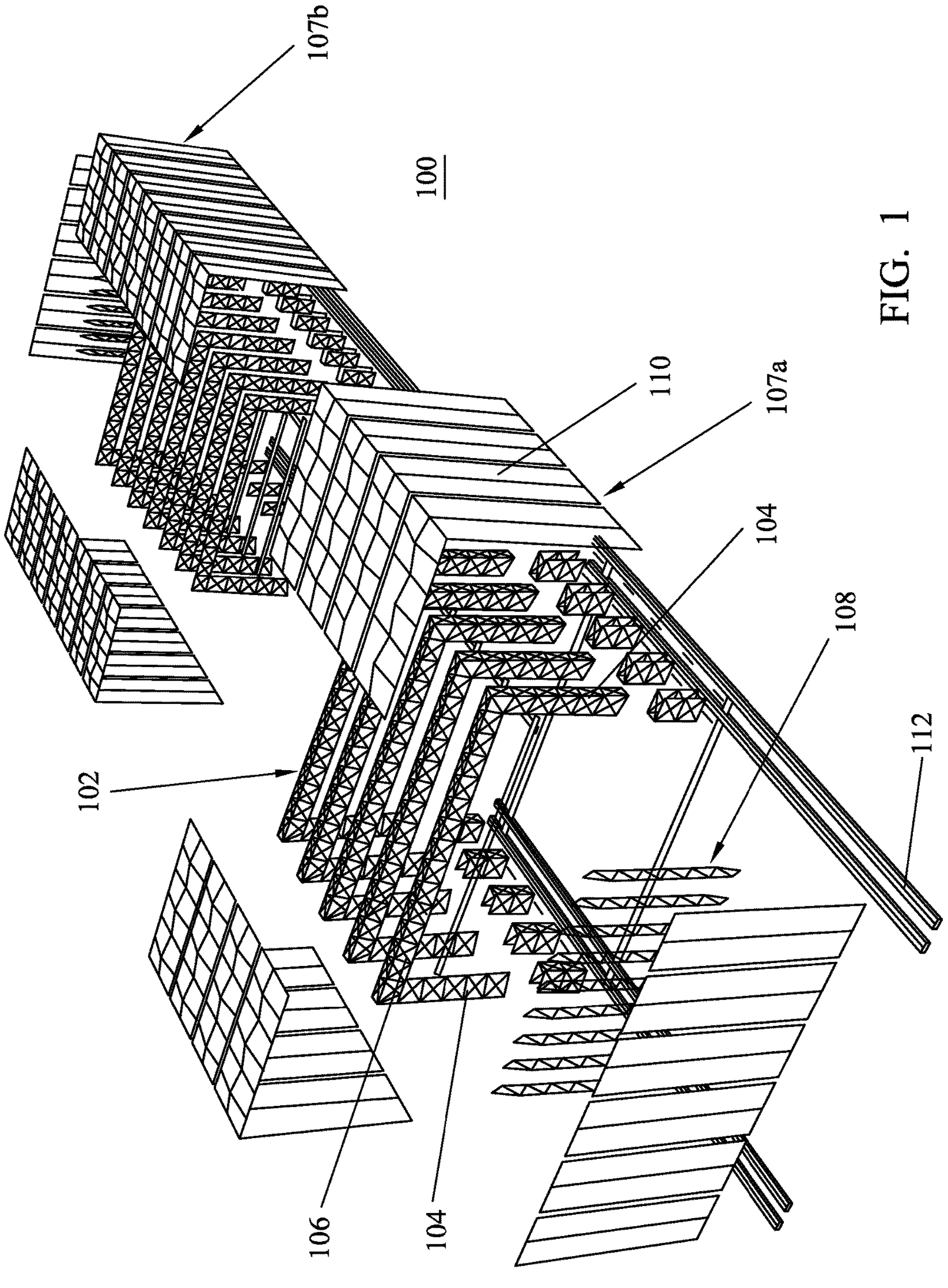
FIG. 1 is a schematic exploded view illustrating the elements of the basic framework of the modular assembly.

FIG. 1 illustrates the elements of the basic framework of the modular assembly 100. As described herein, the modular assembly forms a site factory for constructing a structure, a budding such as a nuclear power plant, in an environment which more closely resembles a factory facility than a conventional construction site. The elements of the basic framework of the modular assembly are made of steel material. Typically the elements are trussed elements formed by a plurality of structural frames into which are inserted diagonal members. The diagonal members help to stabilise the frame.

The modular assembly comprises a plurality of portal frames 102. The use of portal frames allows the creation of a wide-span enclosure which can provide a clear space uninterrupted by intermediary columns. Each portal frame comprises two columns 104 and a roof beam 106. The joints between the roof beam and the columns are rigid, allowing the bending moment in the beam to be transferred to the columns. The roof beam can therefore span large distances and thus provides the uninterrupted space. The modular assembly comprises a series of substantially parallel portal frames that run down the length thereof. Typically the portal frames are 5 to 25 metres apart. The modular assembly shown in FIG. 1 has two sections, a first section 107*a* where the portals are provided 20 m apart, and a second section 107*b* where the portals are provided 15 m apart. The portal frames form the skeleton of the modular assembly 100, Each end of the completed assembly is provided with a number of end trusses 108. Each end truss 108 extends the full height of the modular assembly. Each end truss 108 has a width between 0.5 m and 2 m. A fabric skin or covering 110 is provided which will completely enclose the modular assembly once assembled. The covering comprises a plurality of individual panels. The panels are provided in the form of rolls of fabric which are located on the top of the roof beam before the fabric is unfurled. The size of the roll is determined by the length of fabric required which will be dependent upon the height and width of the modular assembly.

In a preferred embodiment the modular assembly is built upon skid rails 112, each side of the modular assembly being supported by two skid rails. This allows the modular assembly to be moved after it is assembled if it is not built directly over the site. This may be the case if the structure is e.g. a nuclear reactor. In this case the skid rails are laid before any pre-assembled units are delivered to the site or any assembly takes place.

All the elements of the modular assembly are supplied in pre-assembled units and brought to the construction site in separate pieces. These pre-assembled units are of a size that they can be delivered to the site by lorry. Typically this will be in the region of 16 m by 4 m by 4 m max. Once delivered to the site the pre-assembled units are bolted or otherwise connected together to form the columns and roof beams of the modular assembly.

The size of the assembled portal frames are dependent upon the size of the structure which is to be constructed within the modular assembly. Typically the height may be in the region of 60 m with the width being in the region of 120 m, and the length being in the region of 200 m. These dimensions are relevant to the nuclear industry. However the invention is not limited to such dimensions.

Figure 2:
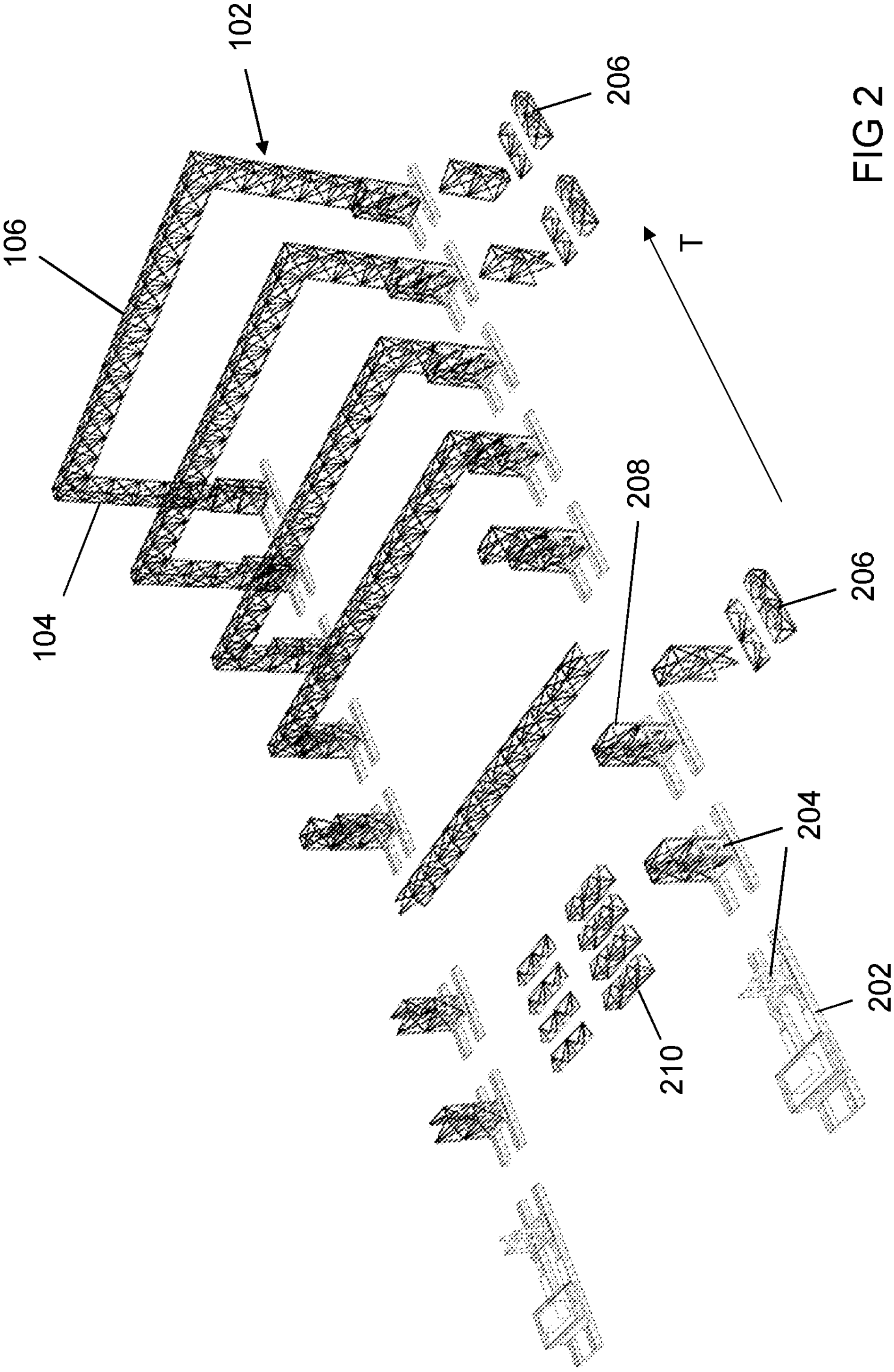
FIG. 2 is a schematic illustration of the assembly of a portal of the modular assembly along time line T.

FIG. 2 illustrates a time line of how one portal of the modular assembly is constructed. As will be appreciated, although FIG. 2 only illustrates a single portal being formed over time, this procedure is carried out for all of the portals substantially simultaneously. As explained above the assembly is delivered to the site in individual pre-assembled units and the assembly built up on site.

The foundations of the modular assembly consist of two strip foundations that are designed for the specific ground conditions of the site. The strip foundation comprises a pair of rails 202 on which a bogie mounted jack-up tower 204 is located. The jack-up towers 204 and bogies are constructed from pre-assembled units. The foundation rails are configured to allow movement of the modular assembly in the direction of the rails. The jack-up towers are pre-assembled at ground level, or are delivered pre-assembled.

Each portal frame 102 comprises two columns 104 and a roof beam 106. The columns 104 of each portal frame are built-up simultaneously, and in a synchronised manner such that the roof of the assembly remains substantially horizontal. Each column comprises a plurality of pre-assembled units 206. Each pre-assembled unit 206 comprises a truss structure as described above. The lowermost, as shown, pre-assembled units 206 are positioned at the correct location by means of the bogie and form an erection frame 208. However, as will be appreciated, once the portal is fully formed the pre-assembled unit 206 forms the joint between the column 104 and the roof beam 106 and so becomes the uppermost pre-assembled unit of the column. The jack-up tower 204 is then used to build-up the columns 104 to the required height by adding further pre-assembled column units. The erection frames 208 are part of the portal frame and remain in position throughout.

Figure 3:
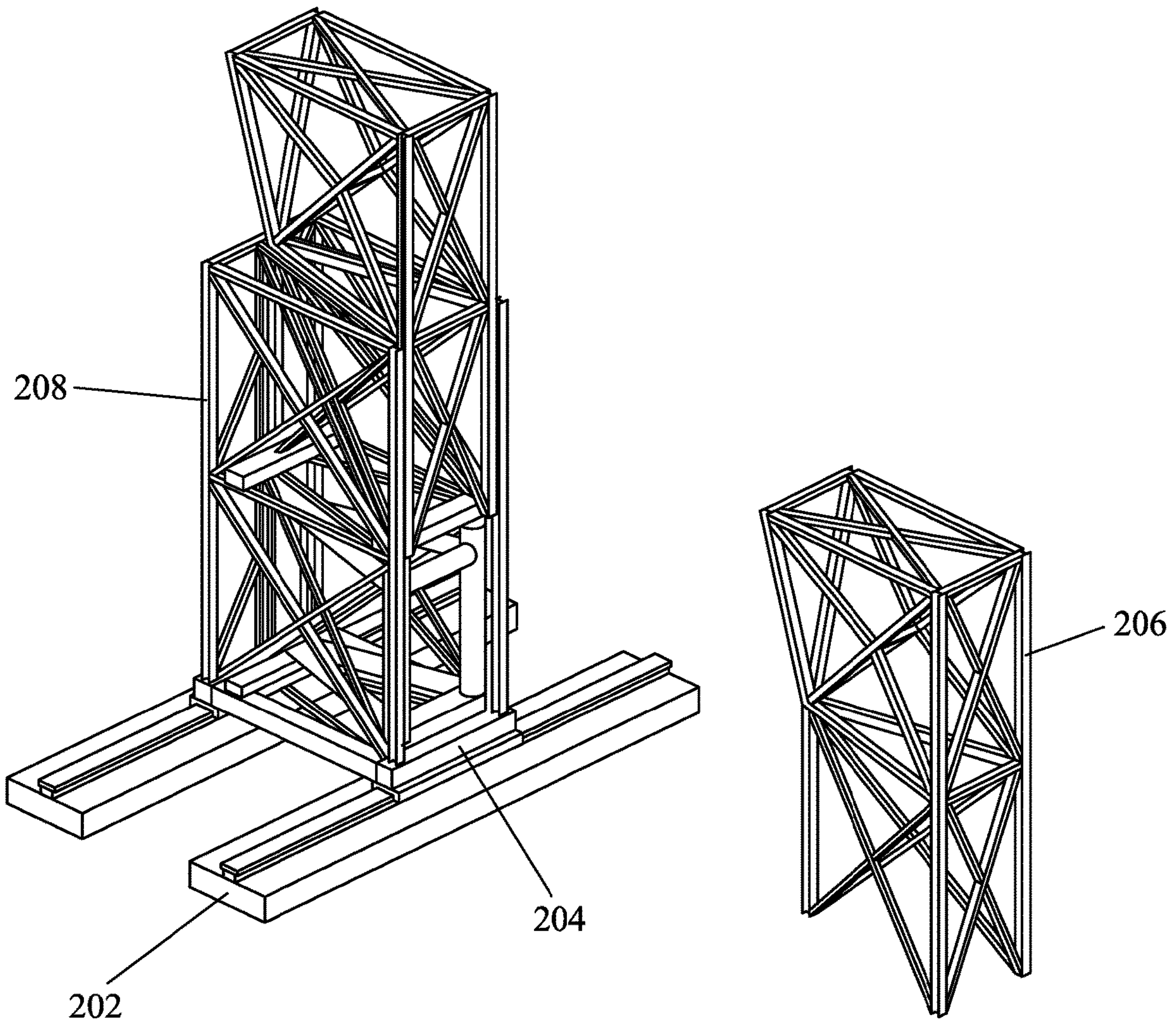
FIG. 3 illustrates a jack-up frame and the erection frame and a unit of a column formed of pre-assembled units.

FIG. 3 is a schematic illustration showing the jack up tower 204 and the erection frame 208 in more detail.

As each pre-assembled unit 206 is added to the column 104 it is locked off and tie bars are connected between each portal frame 102. The tie bars are provided for stability only and do not form part of the load bearing structure. Additional diagonal bracing members are provided between the portals, in both the plane of the walls and of the roof, to provide the modular assembly with sufficient rigidity, for example to withstand side loads, such as wind loads.

Figure 4:
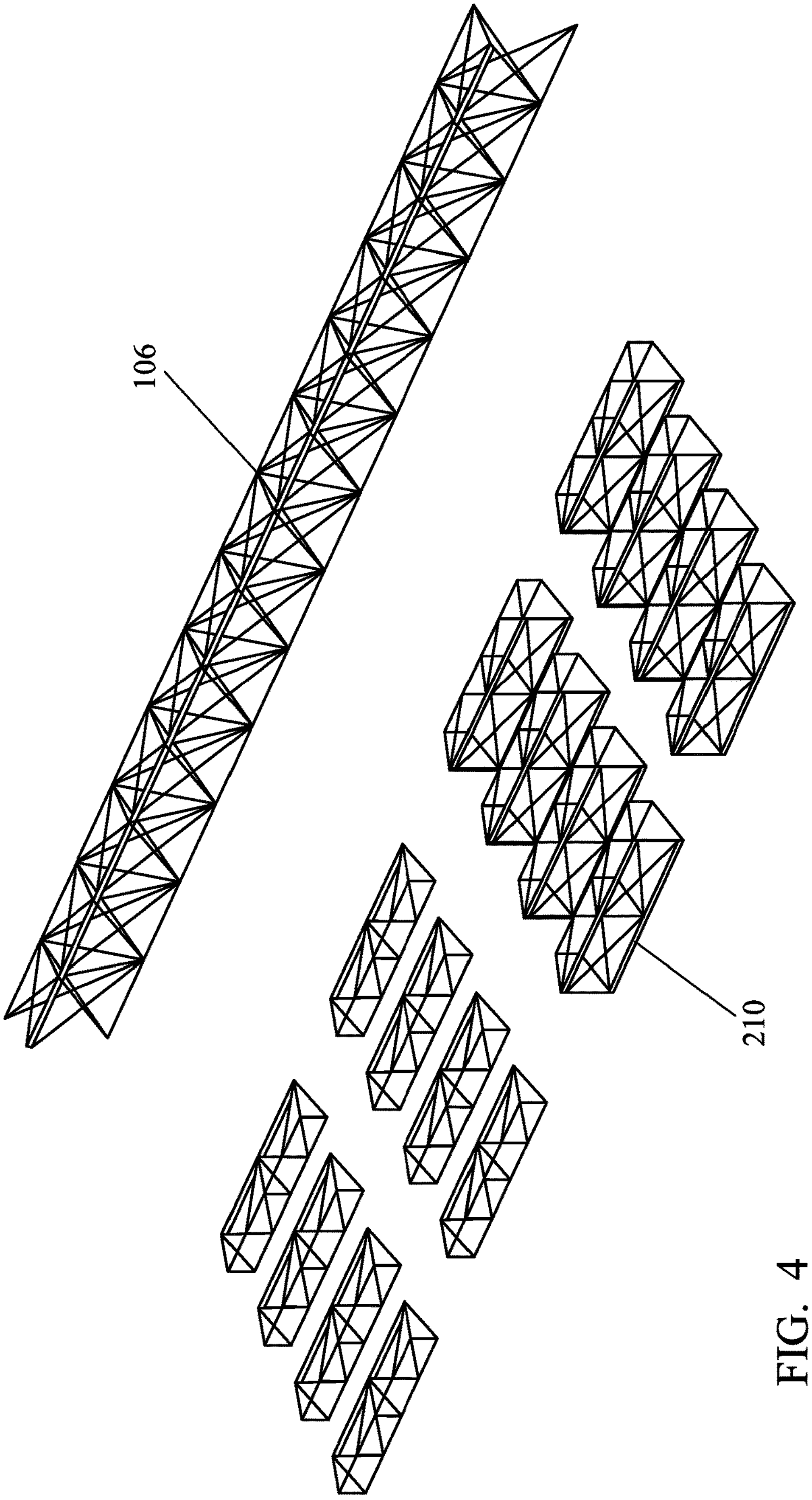
FIG. 4 illustrates the pre-assembled units which form the roof beam.

Once the columns have reached a certain height the roof beam 106 may be assembled. For example, the roof beam may be assembled, and connected to the corresponding columns after the first pre-assembled units of each column are in place, and connected to the erection frame. The roof beam is assembled at low level from a plurality of pre-assembled units 210. FIG. 4 illustrates the roof beam 106 and the pre-assembled units 210 which form the roof beam. Each pre-assembled unit 210 comprises a truss structure as described above. These pre-assembled truss structure units are bolted together to form the roof beam prior to the beam being lifted into position at the top of the columns. The roof beam is lifted onto the columns by crane. All roof mounted equipment is installed by mobile crane from ground level. All equipment, including lighting is installed before the columns are jacked up.

At least two longitudinal (first) rails 502 are bolted or otherwise fixed below the roof beam 106 before the columns are built-up to full height. In the example shown in the figures, in particular in FIG. 5, the first section of the modular assembly is shown with seven such main longitudinal rails. The longitudinal rails span between the plurality of portal frames and run the length of the first section of the modular assembly. Each longitudinal rail is supported by the roof beam. In this particular example, the distance between centres of the longitudinal rails is about 15 m, but may be more or less depending on lifting requirements.

Figure 5:
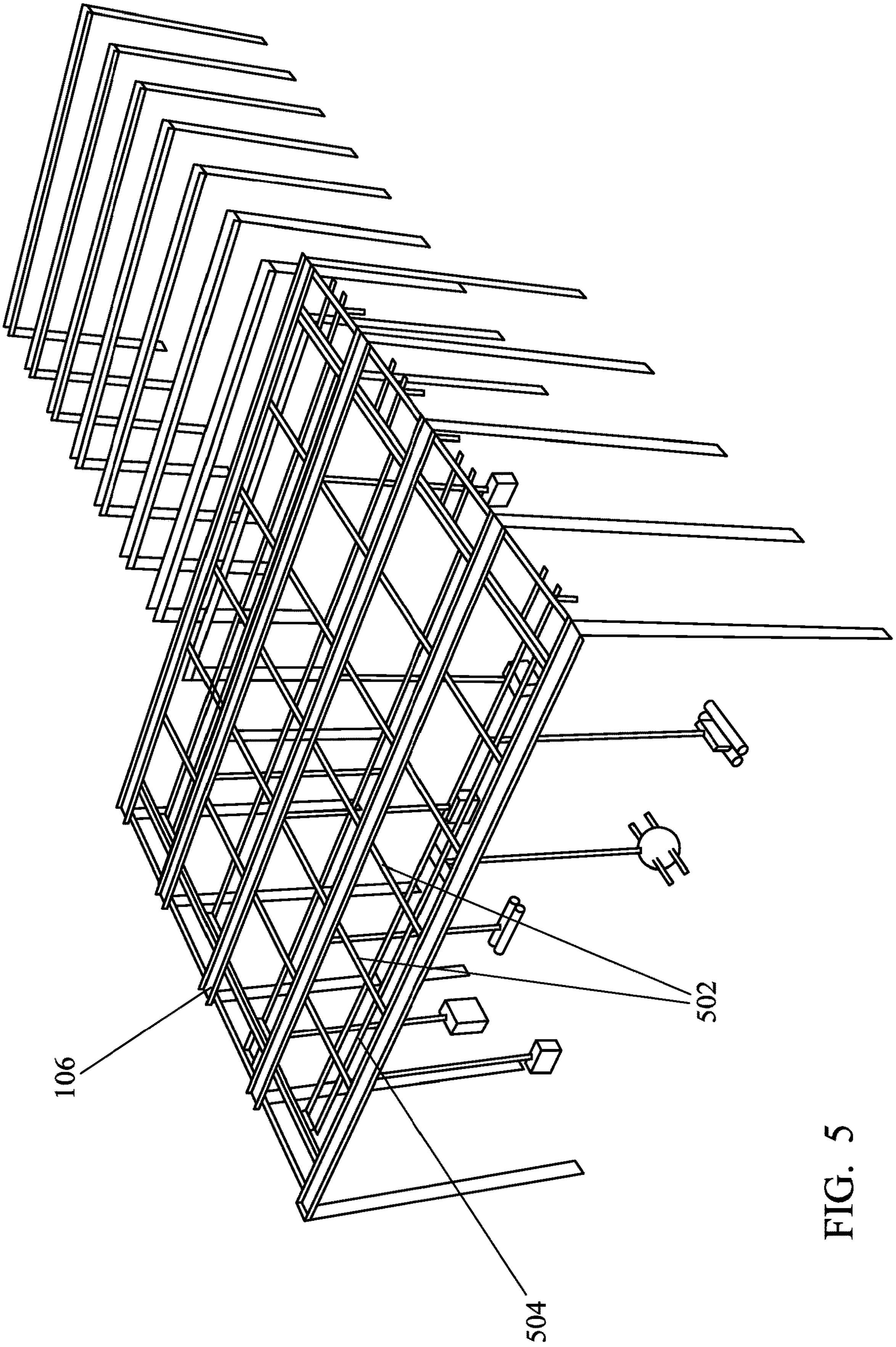
FIG. 5 is a schematic view illustrating how the transverse and longitudinal rails are positioned to allow lifting device movement along two axes of the assembly.
Figure 6:
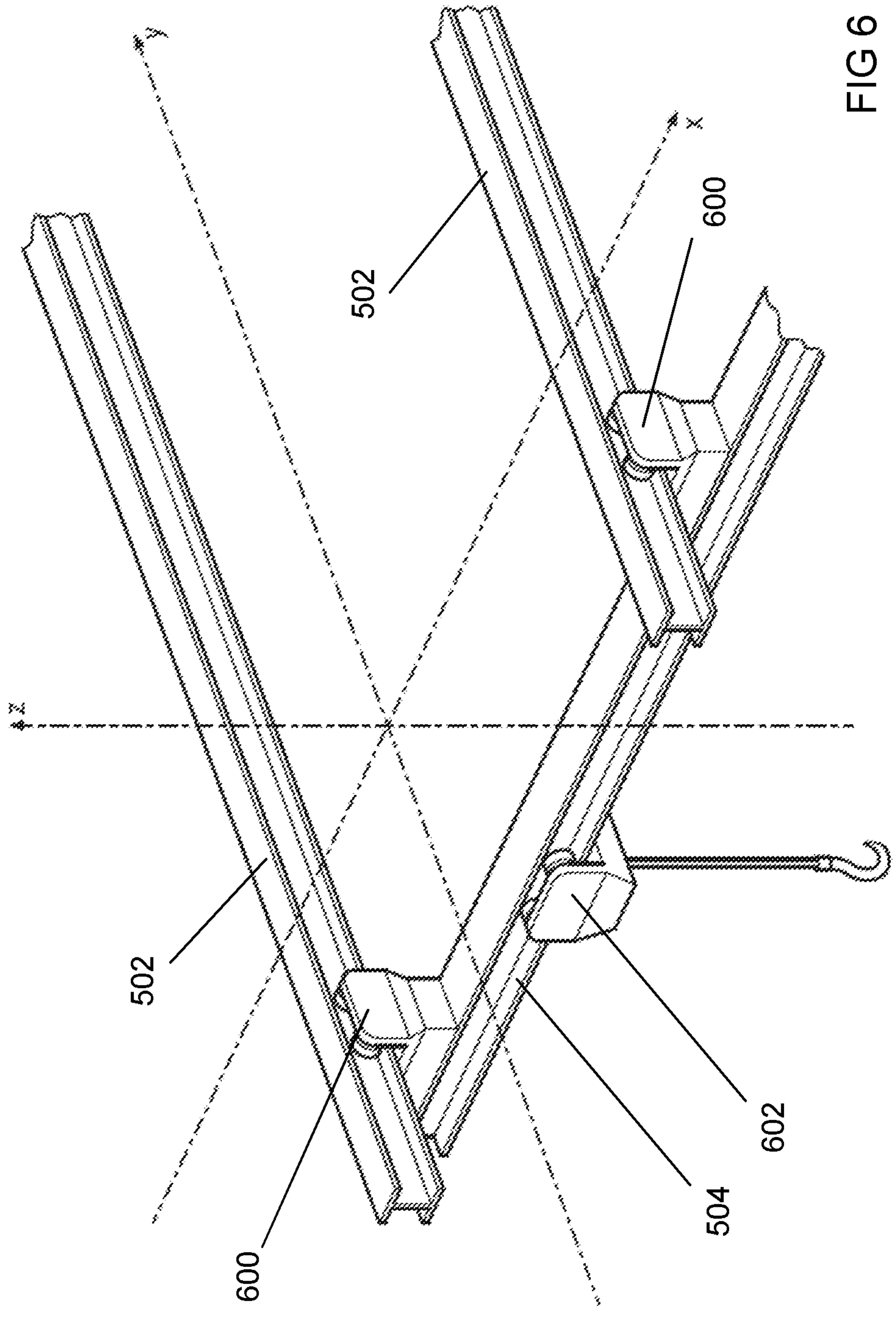
FIG. 6 is a detailed view of a simplified rail and lifting device arrangement.

At least one transverse (second) rail 504, is slidably mounted to the at least two main longitudinal rails 502 by bogies 600, The transverse rails are slidably mounted such that they are substantially perpendicular to the longitudinal rails. In preferred examples, as shown in the figures, the transverse rails are provided in pairs, spaced apart by spacing members. The transverse rails in a set are spaced apart by about 3 m. In the embodiment shown in the figures, in particular in FIG. 5, the first section of the modular assembly is shown with four such pairs of transverse rails. Each set of transverse rails is configured to support one or more lifting devices. This is described in more detail below. However, as shown in FIG. 6, a single transverse rail 504 may be provided, slidably connected to the longitudinal rails 502 by two bogies 600, and having a lifting device 602 slidably connected thereto. Such a simplified version of the rail and lifting device system may be used where the lifting load is relatively low.

Both the longitudinal rails and the transverse rails, and indeed the lifting devices, and any other components, such as lighting, that are connected to the roof beams, are added before the columns are jacked to full height. The assembly of the longitudinal rails and transverse rails relative to the roof are best illustrated in FIG. 5. FIG. 5 is a schematic view of the modular assembly illustrating how the at least one transverse rail and the at least two longitudinal rails are positioned to allow lifting device movement along two axes of the assembly.

Figure 7:
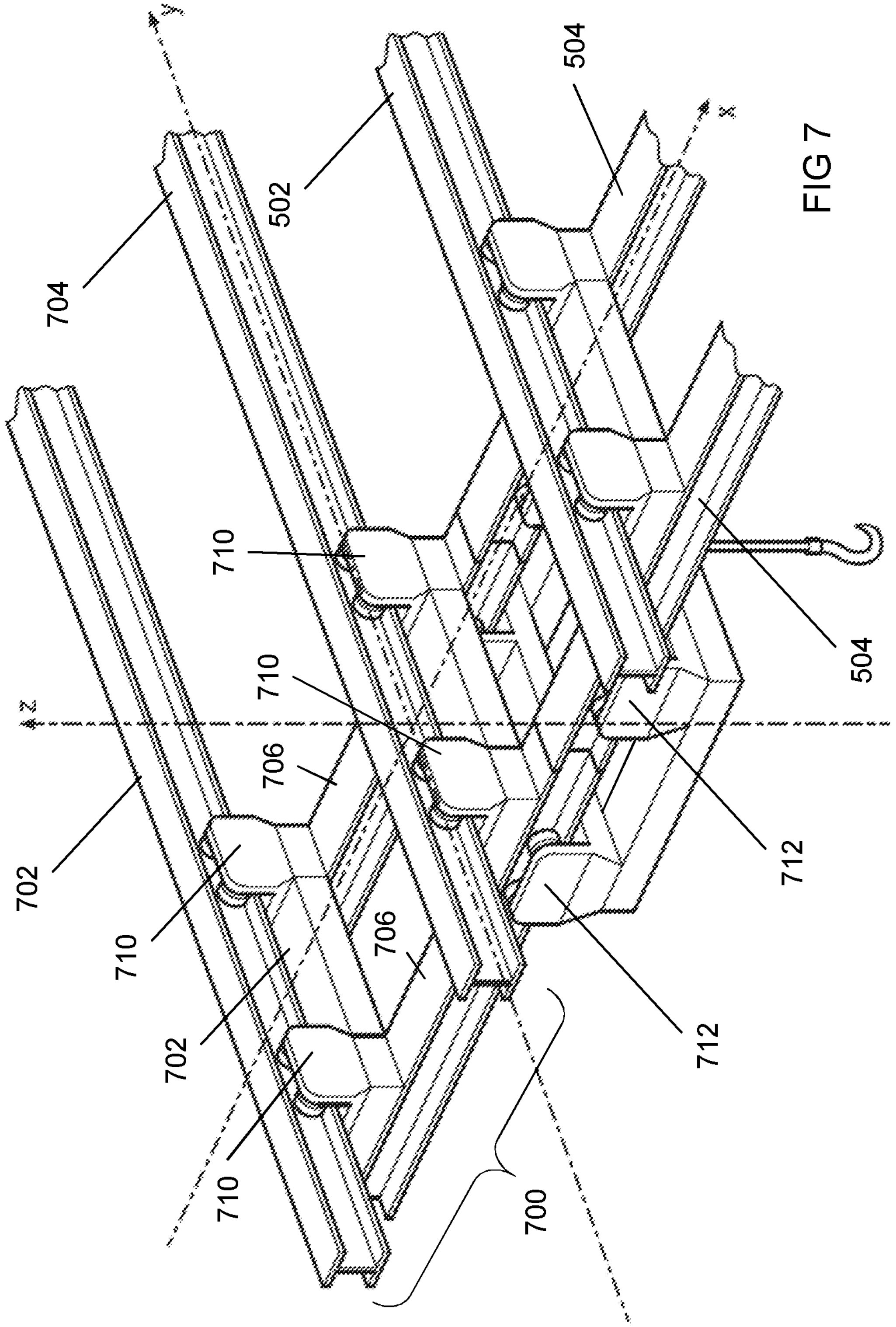
FIG. 7 is a more detailed view of the rails shown in FIG. 5.
Figure 8:
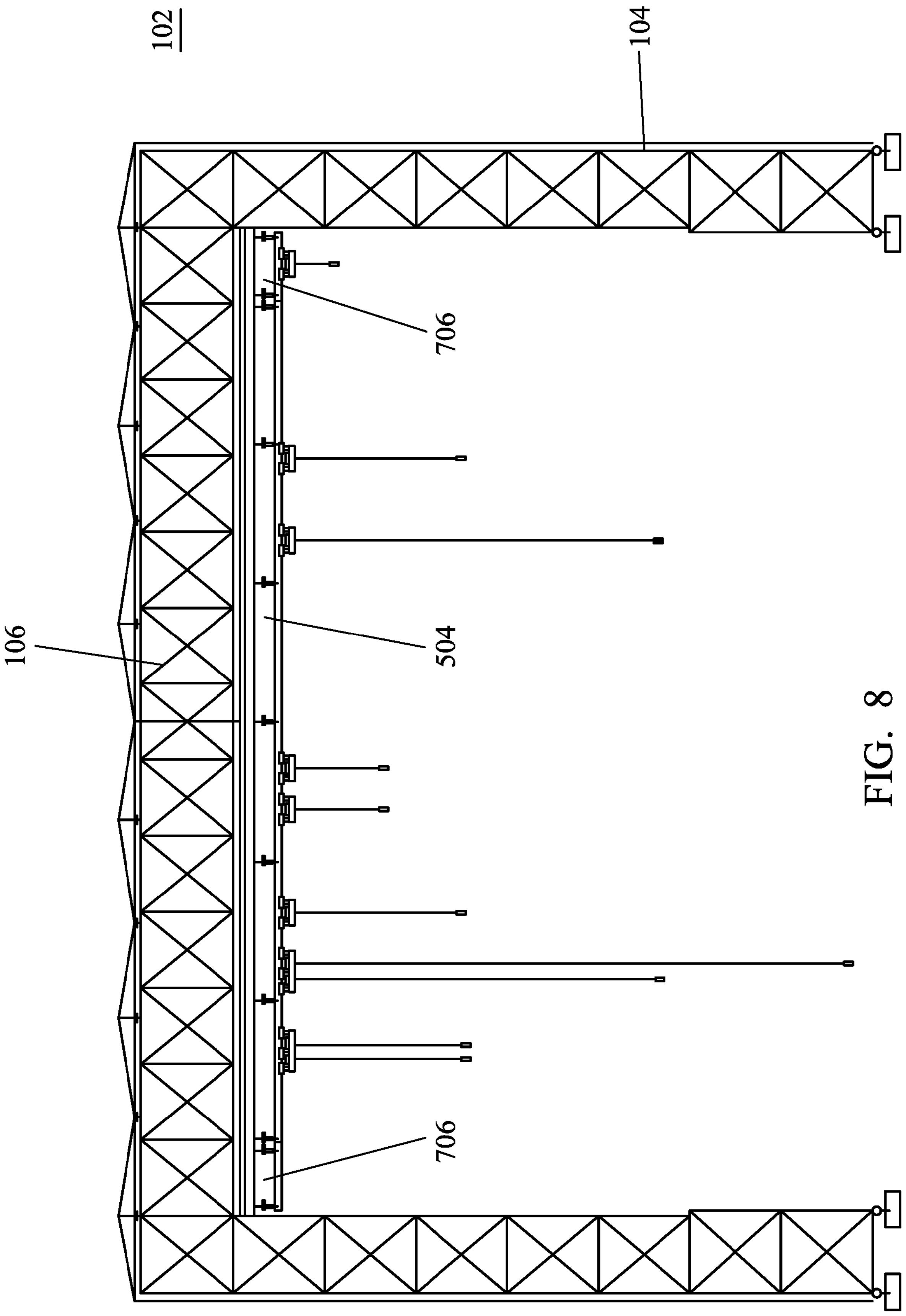
FIG. 8 is a schematic view illustrating a portal frame including the rail and lifting devices.

As can be seen in FIGS. 5, two edge rail systems are provided along respective the longitudinal edges of the modular assembly. FIG. 7 shows the edge rail system 700 in more detail. Each edge rail system 700 comprises two longitudinal edge (third) rails 702 and 704, connected to the roof beams, and arranged in a similar manner to the main longitudinal rails described above. Each edge rail system 700 also comprises at least one transverse edge (fourth) rail 706 slidably mounted to the longitudinal edge rails 702 and 704. In preferred examples, as shown in the figures, the transverse edge rails 702 and 704 are provided in pairs, spaced apart by spacing members 708. The transverse edge rails in a set are spaced apart by about 3 m. In the embodiment shown in the figures, in particular in FIG. 5, the first section of the modular assembly is shown with four such pairs of transverse edge rails disposed on each edge rail system. Each set of transverse rails is configured to support one or more lifting devices. The edge rail system includes bogies 710 which allow the system to travel along the longitudinal edge rails 702 and 704. The lifting devices are carried below the rails 502, 702, 704 of the system by means of bogies 712 on the underside of the rails 706, 504.

As stated above the main longitudinal rails 502 are positioned below the roof beam and are supported by the roof beam. The transverse rails 504 are positioned below the main longitudinal rails and are slidably mounted on the main longitudinal rails. The transverse rails are mounted on the longitudinal rails by means of overhead bogies which allows the transverse rails to run along the longitudinal rails and thus along the length of the modular assembly. The lifting devices are mounted on the transverse rails by means of bogies on the underside thereof. This allows the lifting devices to run along the underside of the transverse rails and thus across the width of the modular assembly. The arrangement of the longitudinal rails and the transverse rails thus allows the lifting devices to move up and down the modular assembly as required. This allows the lifting devices to be precisely maneuvered into a required location. Multiple lifting devices can be moved to construction hot spots as construction intensity moves around the site. The lifting devices are unobstructed within the enclosure.

In order to enable precision building, means for determining the relative position of the or each lifting device, and lifting hook, as compared to the modular assembly are provided. The means for determining the relative position of the or each lifting device and lifting hook comprises a plurality of sensors configured to respectively determine the position of the or each transverse rail supporting the lifting device relative to the longitudinal rails supporting the or each transverse rail, and configured to determine the position of the or each lifting device relative to the or each transverse rail supporting the or each lifting device. The means for determining the relative position of the or each lifting device, further comprises means for determining the relative position of the lifting hook of the lifting device relative to the lifting device.

The lifting devices may be cranes. The cranes can move along the width and length of the modular assembly as described above.

As described above, FIG. 7 is a more detailed view of FIG. 5. The cranes are lifted onto the transverse rail 504 once the initial framework of the modular assembly has been assembled and the longitudinal rails and transverse rails have been connected to the roof beams. Only then are the columns 104 jacked-up to full height. As described above, the edge rail system 700 is provided at the side of the site. The cranes are delivered to the site and travel along the edge rail system over the access road at the side of the site. The edge rail system 700 travels along the assembly until it reaches the transverse rails to which the lifting device is to be transferred. The rails of the edge rail system will then be aligned with the transverse rails. When the rails 504 and 706 are aligned with each other the lifting device may be transferred onto the transverse rail 504. The number of lifting devices is such that the density of hook provision can reflect the amount of construction activity. In use, the lifting devices can be transferred to and from the main transverse rails from and to the edge rail system as required. For example, the edge rail system can be used to transfer delivered components to the main construction site from lorries positioned along the access road. In addition, the edge rail system may be used to transfer lifting devices from one set of main transverse rails to another set of main transverse rails to increase the hook density in any one location, or to increase the lifting capacity in any one location.

Figure 9:
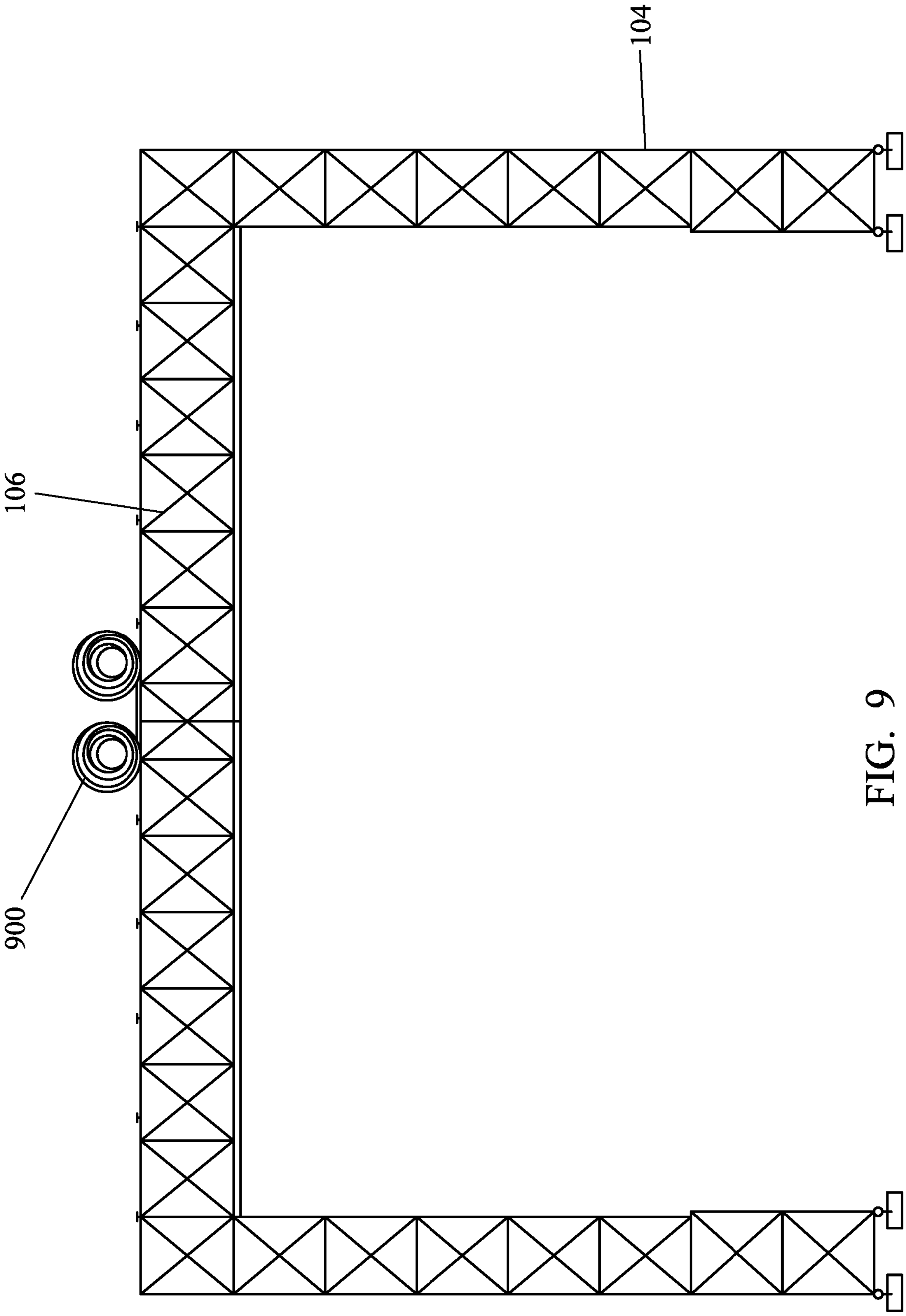
FIG. 9 is a schematic view illustrating the rolls of unfurled fabric located above the roof beam.

Before the roof is jacked-up to full height, rolls of fabric 900 are also installed on the upper side of the roof, as shown in FIG. 9. The rolls are installed in furled condition. The rolls are fixed on the upper side of the roof beam 106 by any suitable means. Each roll provides an individual panel of fabric. The rolls are arranged in pairs in the middle of the roof. A plurality of rolls are provided along the length of the modular assembly. The width of each roll may be substantially the same as the distance from a first edge of a portal frame to the first edge of an adjacent portal frame. This is not however essential and the width may be greater, or less than this. All that is required is that the combined width of the roll of panels is sufficient to cover the length of the modular assembly. When the rolls are unfurled one roll is unfurled down one side of the framework and the other of the pair of rolls is unfurled down the opposite side of the framework. At either end of the modular assembly there is provided further rolls arranged to be unfurled down each end of the assembly to fully enclose the assembly.

Tie bars are fixed between each roof beam for stability, and support, before the rolls of fabric are positioned.

The rolls of fabric 900 located on the upper side of the roof beam 106 are unfurled down either side of the assembly once the modular assembly is assembled and locked in position and equipment, such as the lifting devices, is installed inside. The rolls of fabric can be delivered to the site by lorry.

The fabric used for the fabric rolls must be flexible enough to be supplied as rolls of fabric. Once the rolls are unfurled the fabric panel is rolled out to form the roof and the walls of the modular assembly. The fabric is rolled down the sides of the assembly and seals the modular assembly. The panels are tightened and locked off. It is possible to locate site offices directly adjacent the portal frames. In this case the fabric may unfurl to cover these. Such an embodiment would allow direct access to the interior of the modular assembly through the site offices. In this instance the length of the roll would be increased to accommodate the extra surface area to be covered.

The fabric may have the thermal qualities necessary to regulate the temperature within the modular assembly. A possible fabric could be PVC coated polyester. However, a person skilled in the art will understand that any suitable material may be used. The invention is not limited to the named material. Different fabrics may be used for different environments, depending on the specific requirements of each site. For example more heavy duty protection may be required to significantly reduce noise impact and additional screening may be provided. To reduce noise impact the fabric may comprise a composite material or be formed of a double skin with a suitable filler in between.

It is also important to control the humidity within the site factory enclosure. To that end equipment such as heaters and de-humidifiers may be introduced into the enclosure.

Once the portals of the assembly have been jacked-up to full height, the end trusses 108 are bolted or otherwise connected to either end of the assembly. The end trusses are connected to the portal frames located at each end of the assembly, and are provided with at least one doorway formed of the fabric panels (not shown). Once the end trusses are in place, the rolls of fabric arranged to cover the end walls of the assembly are unfurled, and fixed in place.

Figure 10:
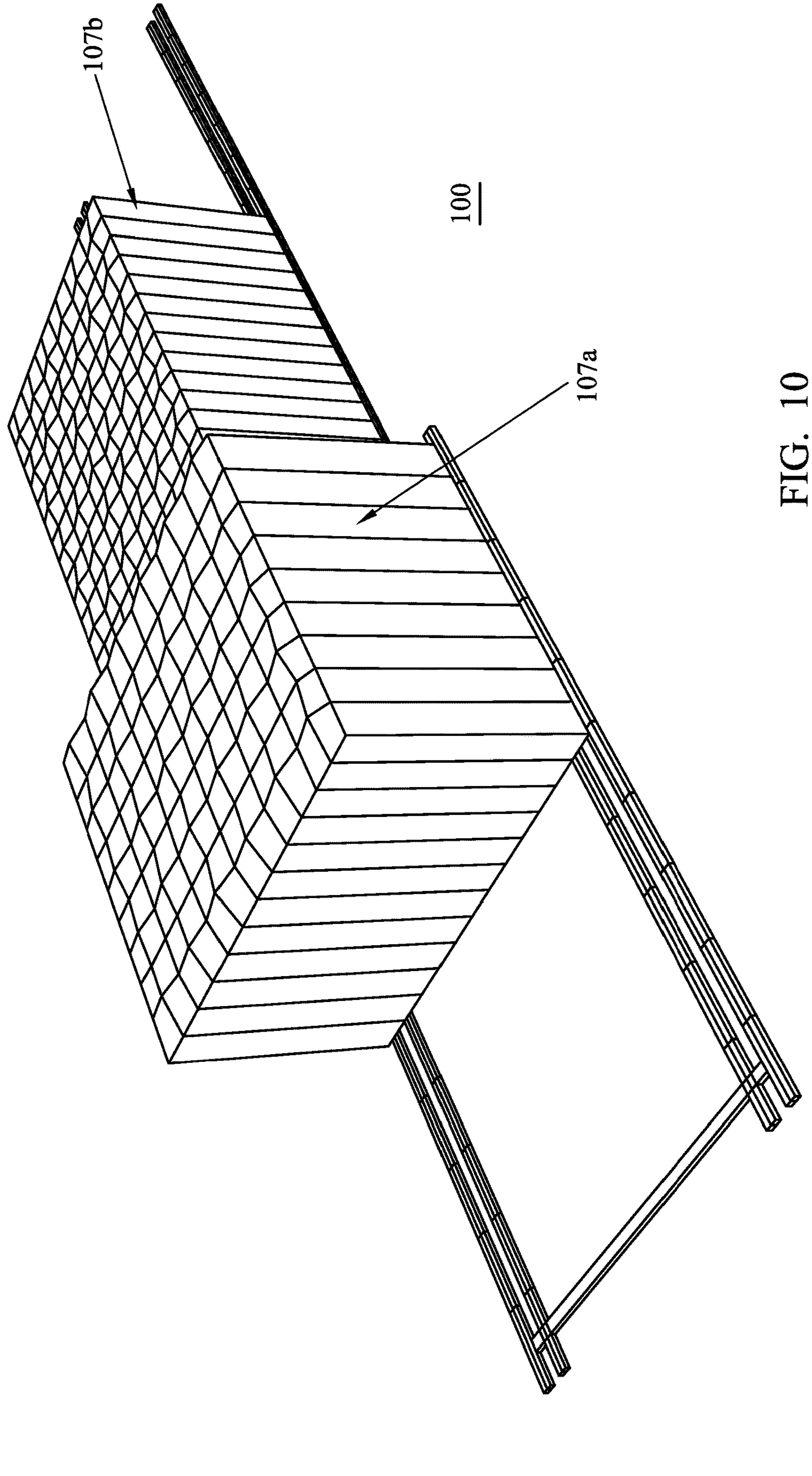
FIG. 10 shows the assembled modular assembly enclosing the construction site.
Figure 11:
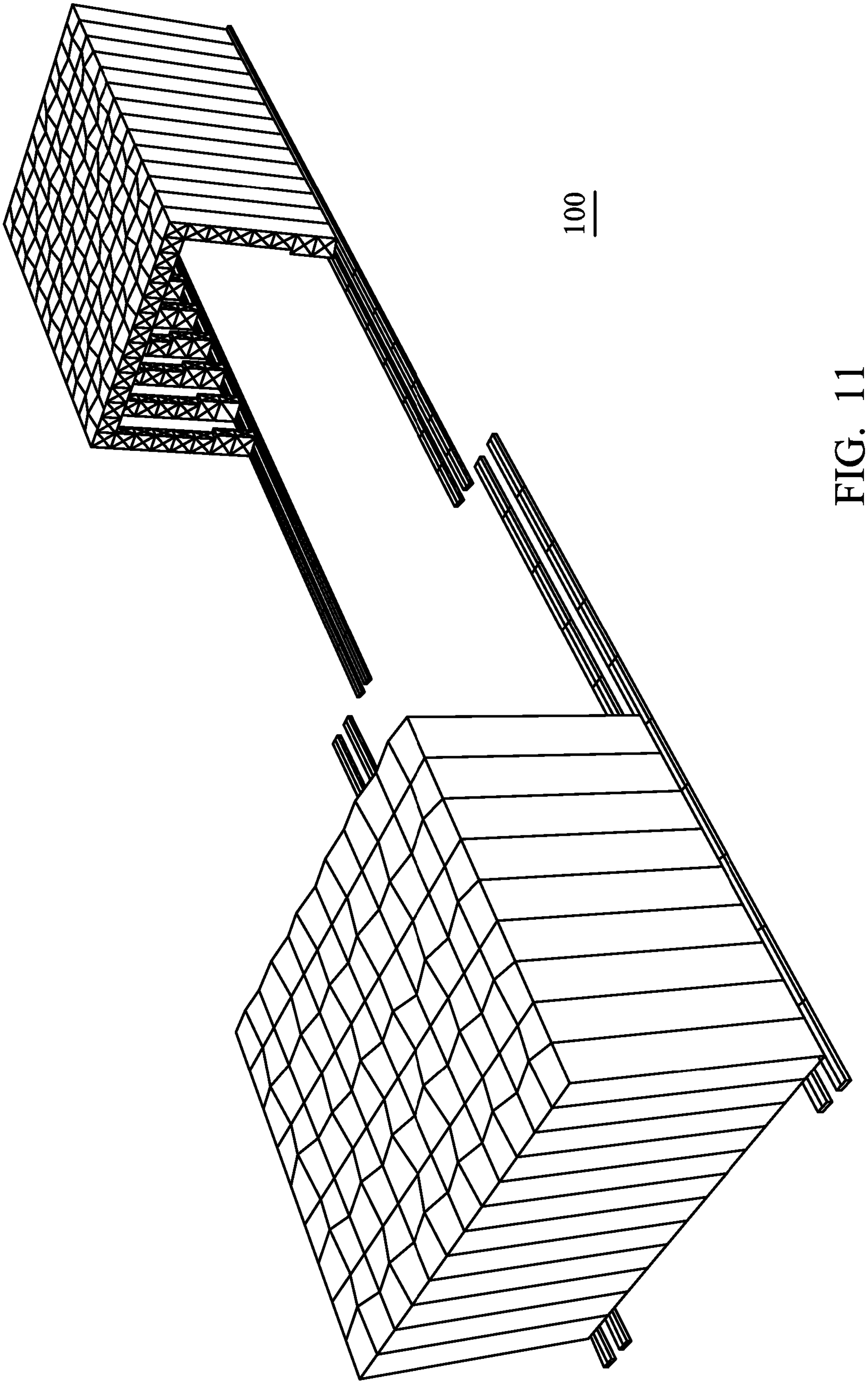
FIG. 11 shows the assembled modular assembly illustrating how the two parts may be moved away from the other.

It will be noted that the figures show portals of two different heights. It is therefore not essential that the entire modular assembly has the same height. FIG. 10 illustrates an assembled modular assembly comprising sections of two differing heights. Such an assembly may be used when structures of two differing heights are to be constructed within the modular assembly, for instance a nuclear reactor and a cooling turbine. The person skilled in the art will understand these are not features of the invention. The modular assembly of the invention is not limited by the type of structure to be built within it. It will be understood by those skilled in the art that the modular assembly may be the same height throughout. The present application has been designed with particular application to nuclear sites. However the person skilled in the art will understand that the structure is not limited to such construction sites.

The modular assembly, in the example shown in the figures, is constructed in two sections; a first section disposed away from a first end of the primary construction site, and a section disposed away from a second end of the construction site. Once each section of the modular assembly is complete, each section is moved into position over the construction site to form a complete enclosure (as shown in FIG. 10).

In use, the modular assembly provides environmental protection for a construction site. The construction can take place within the sealed space of the assembly with significantly reduced influence of external factors. Equally the construction activity will have reduced impact on the outside environment.

The key determinant of construction productivity is material handling, and as described above, the present modular assembly is provided with a plurality of lifting devices to enable that material handling. Each lifting device provides a "20 tonne hook", such that the hooks can be located at any point within the assembly. Using a "swarm" of such "20 tonne hooks" the lifting capacity at any point in the modular assembly can be significantly increased, and the present example allows for individual lifts of up to 170 tonnes.

The construction materials would be supplied to stockpile and processing areas provided at the ends of the modular assembly. The materials are then transferred from these areas, for example using the edge rail system as described above.

As explained above the modular assembly of the example shown in the figures is built upon skid rails. As described above, this allows construction of the modular assembly to take place adjacent to the area of the actual construction site. This feature also allows the modular assembly to be split. Splitting the modular assembly provides a side opening which may allow a particularly heavy or large piece of equipment to enter the assembly. The assembly may then slide again to close the opening. The assembly may also be slid back along the rails to dis-assemble the modular assembly away from the completed structure.

Figure 12:
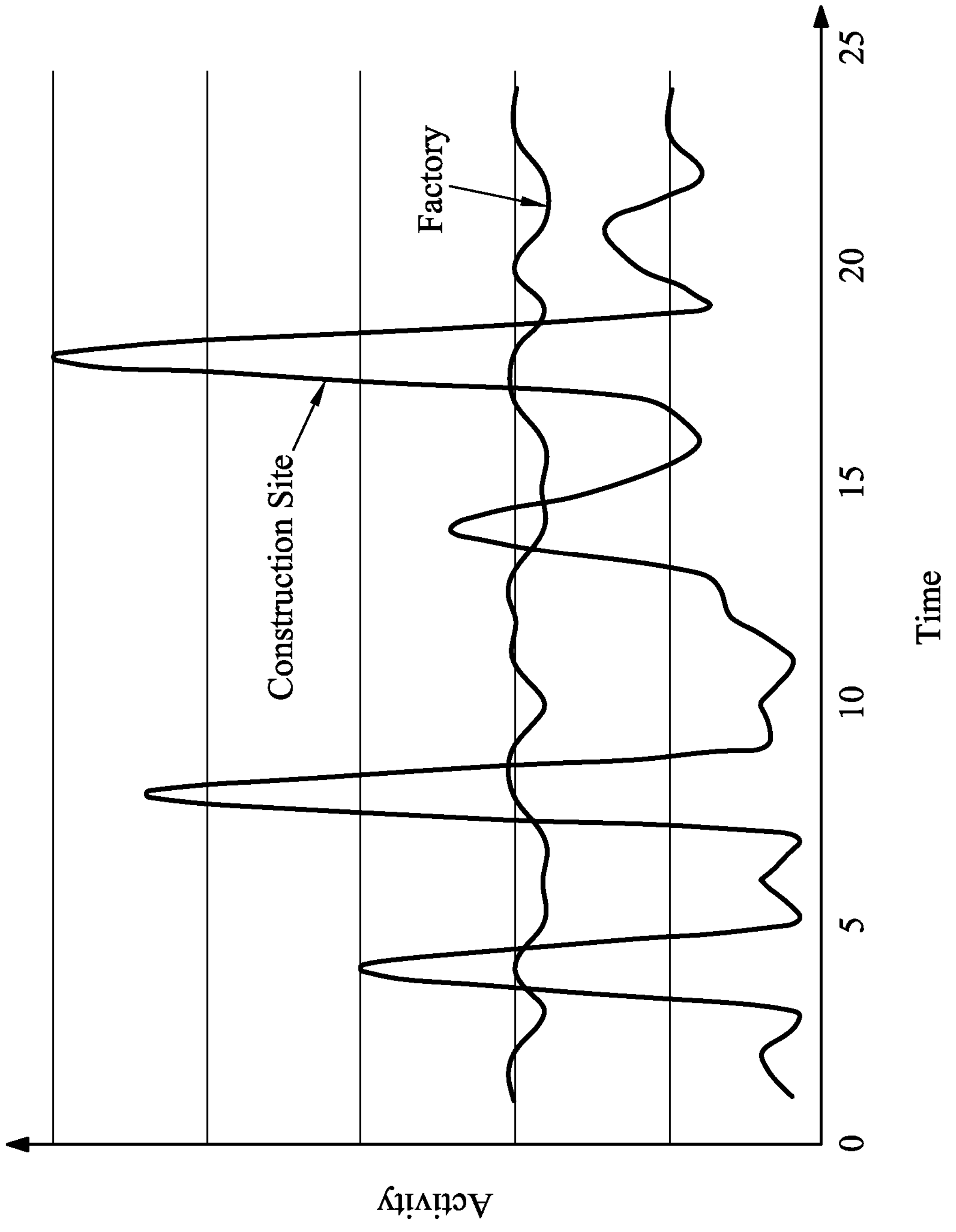
FIG. 12 is graph comparing the amount of construction activity at the construction site when the site is covered by the modular assembly and when it is not covered.

FIG. 12 is graph comparing the amount of construction activity at a construction site when the site is covered by the modular assembly and that of a conventional, open-air, construction site.

As can be seen when a construction site is covered by the modular assembly the activity that can take place is fairly constant. This is due to the fact that exterior variables have a smaller impact on the activity. Compared to a conventional uncovered construction where the amount of activity is hugely variable, the present modular assembly, a site factory, provides significant advantages. The huge variation in building activity can be due to factors such as adverse weather conditions or even just the amount of light available. Having a constant amount of activity allows better forward planning as to how long a project may take, and will likely reduce build time, and reduce costs. It also allows more efficient planning of when parts of the construction site need to be delivered.

The modular assembly remains in place throughout the construction of the structure. This may be several years but will be significantly shorter than if the construction took place outside of the modular assembly. When the construction is finished the modular assembly may be dis-assembled. The dis-assembled units can then be transported away from the site by lorry. The dis-assembled units may be used at another site.

It will be understood by those skilled in the art that the scope of the invention is not limited to the embodiments described above. This written description uses examples to disclose the invention and also to enable any person skilled in the art to practice the invention.

The invention claimed is:

1. A modular assembly for at least partially enclosing a site during construction of a structure, the modular assembly comprising:
- a plurality of portal frames, each portal frame comprising two columns and a roof beam, each column and roof beam comprising a plurality of pre-assembled units;
- a jack-up frame for each column;
- at least two first rails, each of the first rails being mounted to at least one of the roof beams;
- at least one second rail slidably mounted to the at least two first rails; and
- a plurality of panels of a flexible material configured to provide a full enclosure of the site and mounted above the roof beam;
- wherein, the or each second rail is configured to slidably receive at least one lifting device;
- wherein, the pre-assembled units are configured to be connected on site, and lifted using said jack-up frames, to form the portal frames, and wherein each first rail, and the or each second rail are configured to be mounted on the portal frames on site;
- the modular assembly further comprising at least one edge rail system mounted adjacent an edge of the assembly, the or each edge rail system comprising:
  - at least two third rails each of the third rails being mounted to at least one of the roof beams;
  - at least one fourth rail slidably mounted to the at least two third rails to form an edge rail system and configured to slidably receive at least one lifting device,
  - wherein said at least one fourth rail is configured to be alignable with said at least one second rail to enable transfer of a lifting device between the at least one second rail and the at least one fourth rail.

2. A modular assembly according to claim 1, wherein each said first rail is mounted to a plurality of roof beams.

3. A modular assembly according to claim 1, wherein said at least two first rails are mounted such that the distance between the respective centres of said first rails is between about 10 m and about 20 m.

4. A modular assembly according to claim 1, comprising at least one set of second rails, each set comprising a pair of second rails slidably mounted to the at least two first rails, wherein each pair of second rails are spaced apart by a plurality of separation members and configured to receive at least one lifting device configured for use on a double rail system.

5. A modular assembly according to claim 1, further comprising foundation rails configured to allow movement of the assembly.

6. A modular assembly according to claim 5, wherein each portal frame is carried by a bogie, each bogie being configured to be slidably mounted on one of said foundation rails.

7. A modular assembly according to claim 5, wherein the assembly comprises two parts, each part comprising a plurality of portals, each part being slidable independently on said foundation rails such that the parts can be divided once assembled.

8. A modular assembly according to claim 1, comprising at least two said edge rail systems, each said edge rail system disposed adjacent a respective edge of the assembly.

9. A modular assembly according to claim 1, further comprising at least one lifting device slidably mounted to the at least one second rail.

10. A modular assembly according to claim 1, wherein the pre-assembled units of the portal frames are formed from trusses.

11. A modular assembly according to claim 1, further comprising a plurality of end trusses.

12. A modular assembly according to claim 1, wherein the plurality of portals are of at least two differing heights.

13. A modular assembly according to claim 1, wherein the panels are formed from a thermal fabric.

14. A modular assembly according to claim 13, wherein the thermal fabric is a PVC coated polyester.

15. A modular assembly according to claim 1, further comprising panels of noise reducing material.

16. Use of a modular assembly according to claim 1, the modular assembly providing a site factory for the construction of a structure.

17. A method of assembling the modular assembly according to claim 1, the method comprising the steps of:

positioning a plurality of jack up frames;

providing a plurality of pre-assembled units and using said jack up frames to synchronously build up a plurality of portal frames from the pre-assembled units, each portal frame comprising two columns and a roof beam;

mounting at least two first rails to at least one roof beam;

slidably mounting at least one second rail to the at least two first rails;

slidably mounting at least one lifting device to at least one second rail; and mounting a plurality of furled panels of a flexible material on top of the portal frame; wherein the mounting steps take place after the roof beams are connected to the respective columns, and before the columns are built-up to the required height.

18. A method according to claim 17, including providing foundation rails configured to allow movement of the assembly wherein the modular assembly is assembled adjacent the construction site and then slid along the rails to the site, wherein the step of positioning the plurality of jack-up frames comprises rolling said jack-up frames along said foundation rails.

* * * * *